Oct. 20, 1942. F. G. PURINTON 2,299,494
PLASTIC BUTTON
Filed May 1, 1941
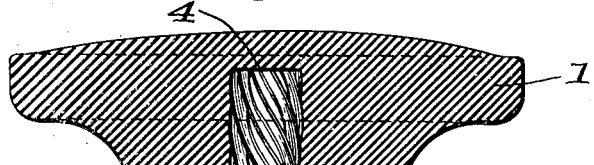
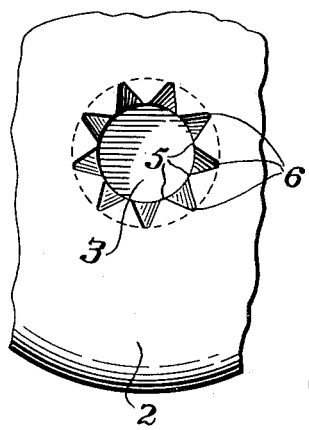
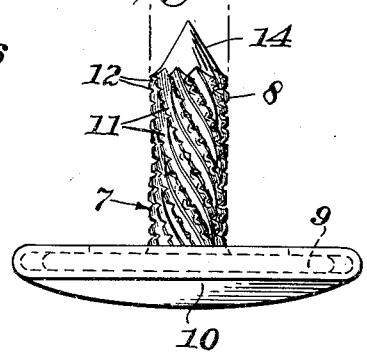
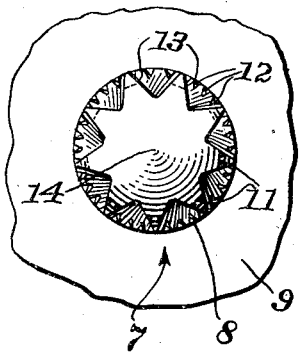
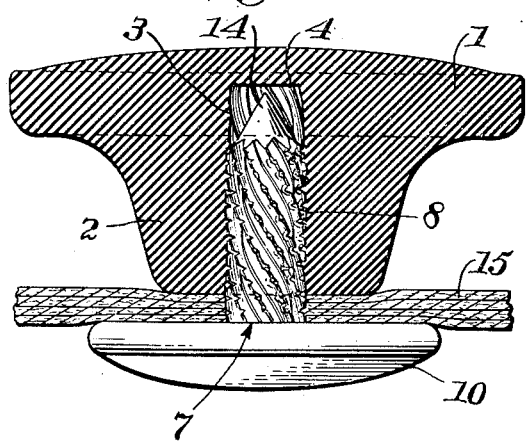
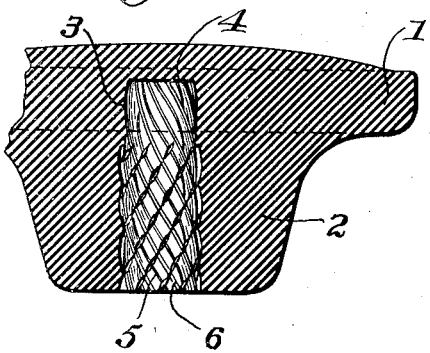
Inventor:
Forrest G. Purinton,
By Parker Cook
Attorney.

Patented Oct. 20, 1942

2,299,494

UNITED STATES PATENT OFFICE 2,299,494

PLASTIC BUTTON

Forrest G. Purinton, Waterbury, Conn., assignor to The Patent Button Company, Waterbury, Conn., a corporation of Connecticut Application May 1, 1941, Serial No. 391,396

2 Claims. (Cl. 24—101)

My invention relates to new and useful improvements in plastic buttons, and more specifically to a plastic button of the tack type.

Heretofore it has been found desirable, if not absolutely essential, that the plastic tack button be reinforced with metal so that on the driving of the fastener into the plastic button it will prevent the hub of the button from splitting.

Generally in the manufacture of plastic buttons with metal reinforcements, the reinforcement has to be placed in the die cavity, and inasmuch as there are usually three or four hundred die cavities in each mold, considerable time and effort are necessary to position the reinforcements in the numerous die cavities.

Also, if the metal reinforcement is exterior to the plastic button, the plastic button has to be dropped or forced into a metal shell, which operation adds to the cost of the button.

One of the principal objects of the present invention, therefore, is to provide a solid molded plastic button which does not need either an exterior or an interior metal reinforcement, thus cutting down considerably the cost in the manufacture of the button.

A further object of the invention is to provide a solid plastic button, the hub of which is provided with a central bore, which bore, in turn, is provided with a helix, that is, ridges and valleys, having say a right-hand pitch. Into this bore will be driven a fastener with flutes having a left-hand pitch or helix, so that the flutes or ridges of the fastener cut across the ridges formed in the bore of the button to thus more tightly hold the fastener in position.

Still another object of the invention is to mold a helix in the bore of the hub of the button and to provide a fastener with flutes extending in the opposite direction, so that not only will the fastener be tightly retained within the button but the valleys formed in the bore will receive the material forced out of the ridges by the advancing fastener and there is no crowding of material, which causes the bursting tendency where a plain round bore is utilized.

Still another object of the invention is to provide a non-reinforced plastic button to receive a fastener of the type shown in my pending application filed April 23, 1941, bearing Serial Number 389,963, for Fluted shank fasteners, which, after once attached, will remain fastened under a pulling strain far greater than necessary for holding buttons to their garments.

Still another object of the invention is to produce a plastic button which is extremely inexpensive to manufacture, as there is no metal insert or no metal covering, thus necessitating but one operation, to wit, the molding operation and possibly a tumbling or cleaning operation thereafter.

With these and other objects in view, the invention consists in certain new and novel arrangements and combination of parts, as will be hereinafter more fully described and pointed out in the claims.

Referring now to the drawing showing a preferred form,

Fig. 1 is an enlarged central sectional view of my improved plastic button as it appears before having a fastener driven therein;

Fig. 2 is an enlarged side elevation of the fastener used with this button;

Fig. 3 is an enlarged sectional view showing the fastener as having been driven through the cloth and into the button;

Fig. 4 is a fragmentary sectional view of the button to show the condition of the bore after the fastener has been driven therein;

Fig. 5 is a bottom plan view of the spirally fluted bore in the hub of the button; and Fig. 6 is a bottom view of the fluted shank fastener.

It might be mentioned at the outset that the button is shown on a greatly enlarged scale; in fact, about a six to one ratio, while Figs. 5 and 6 are shown on a scale twice that of the tack, as shown in Fig. 2.

Referring for the moment to Fig. 1, there is shown a plastic button which may be of the common form of Bakelite, although buttons formed of other plastics or the same plastic having a higher impact strength may, of course, also be used.

The body and head of the button are shown, as at 1, and there is an integral hub 2, which will have the central bore 3. The bore will extend up to the point 4, which is removed far enough from the outer surface of the button to prevent the same from cracking or becoming damaged in use.

It will be understood that other shaped buttons may be used, as the gist of the invention is to provide a non-reinforced plastic button having the central bore 3 provided with ridges 5 and valleys 6 somewhat similar to rifling, and in the present instance I have shown a right-hand helix angle of substantially 25°, although this might be changed to any degree from 15° to 30°.

Of course, a single thread (not shown) might be molded into the button, but this greatly complicates the molding operation, since the button and threaded pin in the die cavity would have to be unscrewed from each other after molding. I have shown the helix as being a right-hand one and, as will be mentioned, the helix of the fastener will be left-handed, but it is to be understood that the conditions may be reversed, that is, the button might just as well have a left-hand helix, provided the helix of the fastener is a right-handed one.

It will also be understood that the diameter of the bore 3 of the button is to be several thousandths of an inch less than the diameter of the shank of the fastener.

Referring now to Fig. 2 for the moment, there is shown a fastener 7 similar to the modified form of fastener shown in my pending application filed April 23, 1941, bearing Serial Number 389,963, for Fluted shank fasteners, heretofore mentioned.

Briefly, it consists of the metal shank 8, which is headed, as at 9, and is provided with the ornamental cap 10. This shank is provided with a plurality of flutes 11 in the form of a helix, and the angle of the helix is shown as of 30°, but this may be less, if so desired.

Superimposed on the flutes or cut about the shank is a plurality of serrations 12, and in cutting these serrations, there are small burrs 13 formed on the under surfaces of the flutes which add to the holding power of the fastener with its button. These flutes, in reality, form ridges and valleys, and I have found that when a fastener, as illustrated, is driven into the fluted bore of the button, the one having a right-hand helix and the other having a left-hand helix, it will cause the ridges of the fastener to cut across the ridges formed in the bore of the hub and the central bore will appear as shown in Fig. 4 after the fastener is driven into place.

I have found that by cutting across the helix, as above-mentioned, the fastener will be held tightly within its button, partially due to the fact that the ridges of the tack flutes cut across four or five of the ridges in the bore of the button. Furthermore, the burrs and serrations of the fastener will bite into the surrounding Bakelite wall of the hub, if the fastener is tried to be removed.

It might be here mentioned that the shank is pointed, as at 14, so that it may easily pierce its cloth 15 (see Fig. 3) during the button-attaching operation.

Possibly the greatest advantage of forming the button and using a shank fastener, as shown, is that the valleys 6 between the ridges 5 in the button will receive or absorb the plastic material cut out of the ridges by the advancing fastener in attaching, so that there is no crowding or jamming of the material within the bore, which would tend to cause breaking or splitting of the hub. In other words, spaces are provided to receive the cut material and thus prevent a splitting or breaking of the hub during the driving of the tack fastener into its button.

As previously mentioned, it has been found desirable to reinforce a plastic button against breakage, because driving a tack within a hub of smaller diameter is likely to split the hub. However, by having the ridges in the shank fastener cut across the ridges formed in the bore, the cut material will be forced into the valleys and thus not cause the expanding of the bore, which would tend to crack the hub.

I have found that a button and fastener as shown cannot be separated under less than a two hundred pound pull, which is far above the requisite in the art of button-attaching and I have also found that by forming the button as shown, the hub will not split or fracture during the time that the shank of the fastener is driven into the bore.

By providing the burrs on the under sides of the flutes of the fastener, no resistance is offered in the attaching movement, as the smooth upper sides of the flutes bear on the grooves in the button. However, on any pulling action between the button and fastener, the burrs on the under sides of the flutes will be forced against the grooves in the button and tend to hook into the ridges thereof and thereby greatly add to the resisting power of the fastener.

Finally, it will be understood that the button might have fibers of other substances incorporated in the molding Bakelite powder, but this, of course, would not require the handling of extra pieces or metal reinforcements, as has heretofore been considered necessary.

The button is extremely simple in construction, relatively inexpensive to manufacture, and after once being fastened, will remain in its attached condition throughout the life of the garment.

Having thus described my invention, what I claim as new and desire to secure by Letters Patent is:

1. The combination of a plastic button having a hub provided with a fluted bore, the flutes being in the form of a helix extending in the one direction—together with a fastener having a fluted shank provided with flutes in the form of a helix and extending in the opposite direction whereby the plastic cut in the ridges of the helix by the entrance of the fastener within the bore will pass between the ridges of the flutes in the bore and thus prevent the button from cracking during the driving of the fluted shank within the said bore.

2. The combination of a plastic button having a hub provided with a helically extended fluted bore together with a shank fastener having helically extending flutes on its outer surface and the flutes extending in a direction opposite to that of the flutes in the bore of the button, the outer diameter of the shank fastener being slightly greater than the inner diameter of the bore of the button whereby the said fastener will have its flutes cut across the flutes in the bore when the fastener is driven therein to thus cause the fastener to be tightly held within the bore, and the flutes extending in the opposite direction permitting the material cut from the bore to pass between the said flutes and thus prevent the hub from cracking during the attaching operation.

FORREST G. PURINTON.